United States Patent
Demsey

(10) Patent No.: US 11,418,920 B2
(45) Date of Patent: *Aug. 16, 2022

(54) SYSTEMS AND METHODS FOR VERIFYING GEOLOCATION DATA OF AN ELECTRONIC CONTENT REQUEST FROM A MOBILE DEVICE

(71) Applicant: Verizon Patent and Licensing Inc., Basking Ridge, NJ (US)

(72) Inventor: Seth Mitchell Demsey, Dulles, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/902,020

(22) Filed: Jun. 15, 2020

(65) Prior Publication Data

US 2020/0314599 A1 Oct. 1, 2020

Related U.S. Application Data

(63) Continuation of application No. 15/730,339, filed on Oct. 11, 2017, now Pat. No. 10,687,301, which is a
(Continued)

(51) Int. Cl.
| | |
|---|---|
| H04W 24/00 | (2009.01) |
| H04W 4/029 | (2018.01) |
| H04W 4/02 | (2018.01) |
| H04W 4/18 | (2009.01) |
| H04W 12/10 | (2021.01) |
| H04W 12/12 | (2021.01) |
| H04L 9/40 | (2022.01) |

(Continued)

(52) U.S. Cl.
CPC .......... *H04W 4/029* (2018.02); *H04L 63/107* (2013.01); *H04W 4/02* (2013.01); *H04W 4/021* (2013.01); *H04W 4/185* (2013.01); *H04W 12/10* (2013.01); *H04W 12/12* (2013.01); *H04W 64/00* (2013.01); *H04W 12/63* (2021.01); *H04W 12/64* (2021.01); *H04W 12/71* (2021.01); *H04W 12/72* (2021.01)

(58) Field of Classification Search
None
See application file for complete search history.

(56) References Cited

U.S. PATENT DOCUMENTS

| | | |
|---|---|---|
| 9,456,348 B2 | 9/2016 | Dennis et al. |
| 9,781,602 B1 | 10/2017 | Girdhar et al. |

(Continued)

*Primary Examiner* — Suhail Khan

(57) ABSTRACT

Methods, systems, and computer-readable media are disclosed for verifying geolocation data provided with an electronic content request received from a mobile device. One method includes: receiving, over a network, a content request including a unique identifier and geolocation data; determining a unique device identifier of a mobile device based on the received unique identifier; transmit, over the network, a verification request that requests geolocation data of the mobile device, the verification request including the unique identifier of the mobile device; receiving, over the network, verified geolocation data of the mobile device in response to the transmitted verification request; verifying the geolocation data included with the content request based on the verified geolocation data; and transmitting, over the network, a verification result.

20 Claims, 4 Drawing Sheets

Related U.S. Application Data continuation of application No. 15/196,687, filed on Jun. 29, 2016, now Pat. No. 9,820,255.

(51) Int. Cl.
 *H04W 4/021* (2018.01)
 *H04W 64/00* (2009.01)
 *H04W 12/63* (2021.01)
 *H04W 12/71* (2021.01)
 *H04W 12/72* (2021.01)
 *H04W 12/64* (2021.01)

(56) References Cited

U.S. PATENT DOCUMENTS

| | | |
|---|---|---|
| 2007/0256135 A1 | 11/2007 | Doradla et al. |
| 2013/0115872 A1 | 5/2013 | Huang et al. |
| 2014/0057596 A1 | 2/2014 | Brill et al. |
| 2017/0238153 A1* | 8/2017 | Daoud .................... H04W 4/14 455/466 |

* cited by examiner

SYSTEMS AND METHODS FOR VERIFYING GEOLOCATION DATA OF AN ELECTRONIC CONTENT REQUEST FROM A MOBILE DEVICE

CROSS-REFERENCE TO RELATED APPLICATION(S)

This patent application is a continuation of and claims the benefit of priority to U.S. application Ser. No. 15/730,339, filed on Oct. 11, 2017, which is a continuation of and claims the benefit of priority to U.S. application Ser. No. 15/196,687, filed Jun. 29, 2016, now U.S. Pat. No. 9,820,255, the entireties of which are incorporated herein by reference.

TECHNICAL FIELD

The present disclosure relates to verifying geolocation data provided with electronic content requests received from mobile devices. More particularly, the present disclosure relates to verifying geolocation data provided with electronic content requests received from mobile devices by using geolocation data obtained from a mobile device network service provider.

BACKGROUND

Mobile devices use mobile wireless communication networks to access different services, such as, for example, video streaming and/or interactive messaging, e-mail, text messaging, web surfing, etc. Applications requesting content from these different services sometimes provide geolocation data with the content requests. The geolocation data may be used by content providers to localize content, provide targeted content, etc. However, the geolocation data provided with content requests may be fraudulent, inaccurate, and/or dated. For example, content providers and advertisers may pay application providers a premium price for electronic content requests that include geolocation data because geolocation data may be used to more accurately target content and/or advertisements to a user of the application. Thus, application providers may be incentivized to provide fraudulent, inaccurate, and/or dated geolocation data to benefit from the premium value.

Thus, embodiments of the present disclosure relate to verification of geolocation data provided with content requests from mobile devices by utilizing a mobile device network service provider to which the mobile devices are connected.

SUMMARY OF THE DISCLOSURE

Embodiments of the present disclosure include systems, methods, and computer-readable media for verifying geolocation data provided with an electronic content request received from a mobile device.

According to embodiments of the present disclosure, computer-implemented methods are disclosed for verifying geolocation data provided with an electronic content request received from a mobile device. One method includes: receiving, over a network at one or more servers, a content request including a unique identifier and geolocation data; determining, by the one or more servers, a unique device identifier of a mobile device based on the received unique identifier; transmit, over the network by the one or more servers, a verification request that requests geolocation data of the mobile device, the verification request including the unique identifier of the mobile device; receiving, over the network at the one or more servers, verified geolocation data of the mobile device in response to the transmitted verification request; verifying, by the one or more servers, the geolocation data included with the content request based on the verified geolocation data; and transmitting, over the network by the one or more servers, a verification result.

According to embodiments of the present disclosure, systems are disclosed for verifying geolocation data provided with an electronic content request received from a mobile device. One system includes a data storage device that stores instructions system for verifying geolocation data provided with an electronic content request received from a mobile device; and a processor configured to execute the instructions to perform a method including: receiving, over a network, a content request including a unique identifier and geolocation data; determining a unique device identifier of a mobile device based on the received unique identifier; transmit, over the network, a verification request that requests geolocation data of the mobile device, the verification request including the unique identifier of the mobile device; receiving, over the network, verified geolocation data of the mobile device in response to the transmitted verification request; verifying the geolocation data included with the content request based on the verified geolocation data; and transmitting, over the network, a verification result.

According to embodiments of the present disclosure, non-transitory computer-readable media storing instructions that, when executed by a computer, cause the computer to perform a method for verifying geolocation data provided with an electronic content request received from a mobile device are also disclosed. One method of the non-transitory computer-readable medium including: receiving, over a network, a content request including a unique identifier and geolocation data; determining a unique device identifier of a mobile device based on the received unique identifier; transmit, over the network, a verification request that requests geolocation data of the mobile device, the verification request including the unique identifier of the mobile device; receiving, over the network, verified geolocation data of the mobile device in response to the transmitted verification request; verifying the geolocation data included with the content request based on the verified geolocation data; and transmitting, over the network, a verification result.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Figure 1:
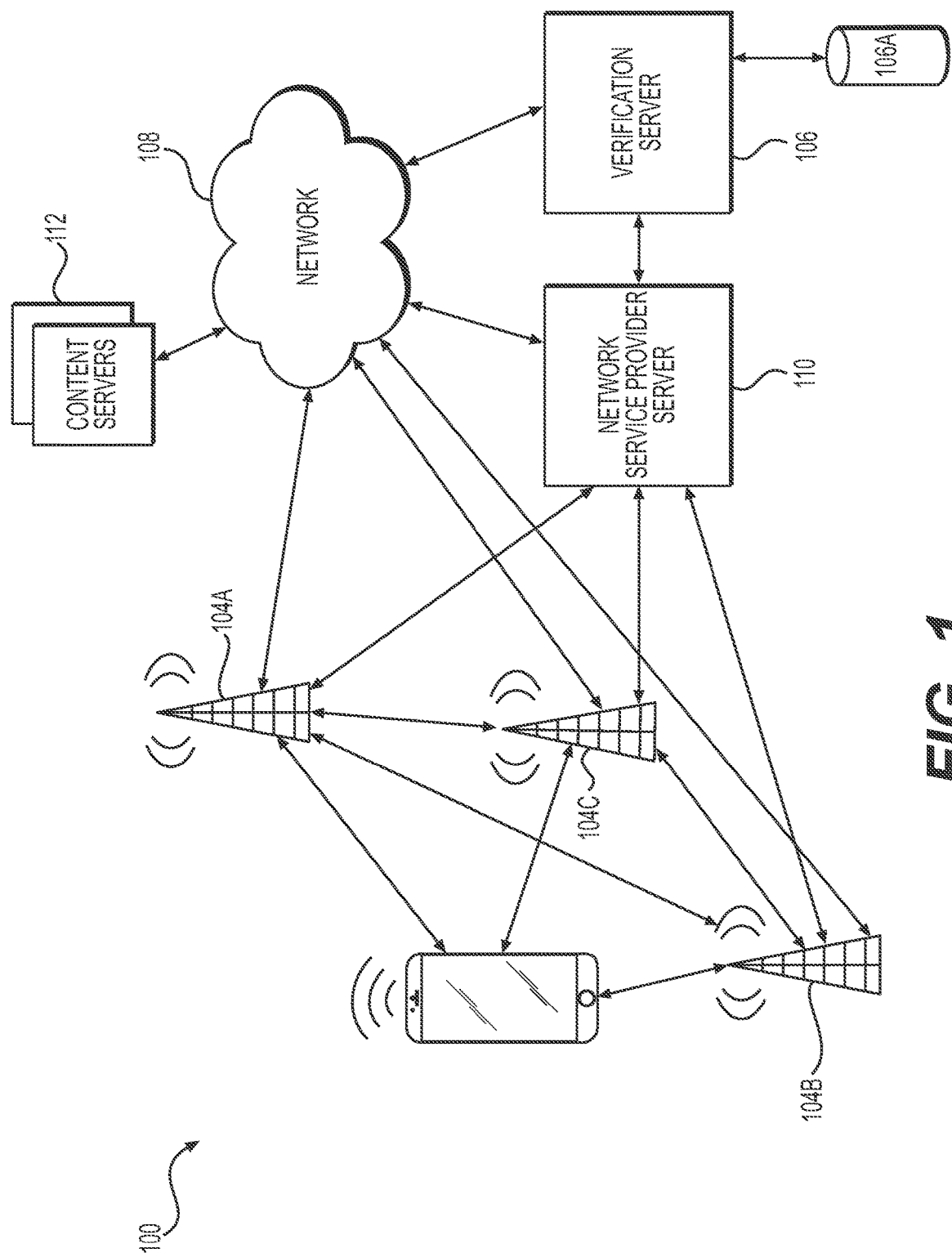
FIG. 1 depicts a schematic diagram of a network environment for a method for verifying geolocation data provided with an electronic content request received from a mobile device, according to embodiments of the present disclosure.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION OF EMBODIMENTS

The following detailed description refers to the accompanying drawings. The same reference numbers in different drawings may identify the same or similar elements.

Systems and methods described herein enable the verification of geolocation data that is provided with electronic content requests received from a mobile device by using geolocation data obtained from a mobile device network service provider. In particular, a mobile device network service provider (i.e., a "carrier") may use one or more methods of obtaining accurate geolocation data from a mobile device that transmits content requests. The systems and methods may allow for obtaining more accurate geolocation data, verification of geolocation data, and/or protection against fraudulent geolocation data provided with content requests. In a conventional system, a content provider that responds to content requests must rely on the geolocation data provided with the content requests. The geolocation data provided with the content requests may be old, inaccurate, and/or fraudulent, and a content provider has no way to verify the geolocation data. Embodiments described herein may allow applications, application providers, and/or content providers to use geolocation data from a mobile device network service provider's systems to verify the accuracy of geolocation data provided by an application running on the mobile device, and may allow for more accurate geolocation data to be used in responding to content requests.

An application running on a mobile device of a user may transmit to a content server one or more requests for content where the request is appended with geolocation data. The geolocation data provided with a content request may be used, for example, to provide content in response to the content request that is relevant to the geographic location corresponding to the geolocation data and/or to provide targeted content, such as a local advertisement, that is relevant to the geographic location corresponding to the geolocation data. The content request may be, for example, a request for an advertisement, a website, a photo, a video, a stream, data, etc. The geolocation data provided with the request may be one or more of GPS data, an address, a zip code, a postal code, a latitude, a longitude, an IP address, a country, a region, a city, a time zone, and/or other geolocation information.

In order to ensure the geolocation data provided with the content request is non-fraudulent, up-to-date, and/or accurate, a verification server may verify the geographic location of the mobile device that transmitted the content request. The verification server may verify the accuracy of the geographic location provided with the content request by requesting verified geolocation data from a mobile device network service provider (i.e., a mobile telecom carrier), requesting verified geolocation data directly from the mobile device, and/or by looking up stored geolocation data in a database. Additionally, the verification server may score the accuracy of the geographic location based on a proximity of the geolocation data provided with the content request to the verified geolocation data. Further, the verification server may score the accuracy of the geolocation data provided with the content request based on a timestamp provided with the content request compared to a timestamp of the verified geolocation data.

FIG. 1 depicts a schematic diagram of an electronic network environment 100 for a method for verifying geolocation data provided with an electronic content request received from a mobile device 102, according to embodiments of the present disclosure. As shown in FIG. 1, the electronic network environment 100 may include at least one mobile device 102, a plurality of cell towers 104A, 104B, and 104C, a verification server 106, a mobile device network server provider 110, and one or more content servers 112. For ease of explanation, only a limited number of network elements are shown in the electronic network environment 100 depicted in FIG. 1. However, it should be understood that a greater number of network elements may be part of the electronic network environment 100, including other types of known network entities not illustrated in FIG. 1. Other embodiments may include additional or different network entities in alternative configurations than which are exemplified in FIG. 1. Additionally, embodiments described herein may be presented within the context of the wireless communication networks for ease of explanation. However, aspects of the present disclosure are not restricted to the wireless communication networks.

Mobile device 102 may communicate with content servers 112 via network 108 (e.g., the Internet) and one or more of the plurality of cell towers 104A, 104B, and 104C. For example, both network 108 and the one or more of the plurality of cell towers 104A, 104B, and 104C may be used to transmit data between the mobile device 102 and one or more of the plurality of content servers 112.

Mobile device 102 may include software applications with a variety of functionalities. A software application running on mobile device 102 may transmit content requests on behalf of a user of the mobile device 102 to content servers 112. For example, the software application may transmit one or more content requests to one or more content servers 112, such as requests for web pages, videos, images, and files, that have been requested by the user of the mobile device 102.

Each time an application transmits a content request, the application may also provide geolocation data with the transmitted content request. In one embodiment of the present disclosure, the application may transmit, via network 108 and/or the one or more of the plurality of cell towers 104A, 104B, and 104C, the content request with geolocation data to the verification server 106. Alternatively, or additionally, the application may transmit, via network 108 and/or the one or more of the plurality of cell towers 104A, 1046, and 104C, the content request with geolocation data to the content servers 112, and the content servers 112 may transmit, via network 108, the content requests with geolocation data to the verification server 106.

The content request may also include one or more of a unique device identifier, a unique user identifier, geolocation data, a timestamp, a date stamp, and/or a description of the content requested. The unique device identifier may identify the mobile device 102. The unique user identifier may identify the user of the mobile device 102. The geolocation data may include one or more of GPS data, an address, a zip code, a postal code, a latitude, a longitude, an IP address, a country, a region, a city, a time zone, and/or other location data.

The verification server 106 may receive the content request and begin verification of the geolocation data provided with the content request. The verification server 106 may determine whether to lookup a unique device identifier based on the unique user identifier provided with the request. For example, a unique device identifier may be a telephone number and/or an electronic serial number (ESN) of the mobile device 102. If a unique user identifier was provided with the content request, then the verification server 106 may look up an associated unique device identifier, such as a telephone number and/or ESN, in a verification server database 106A that stores associated unique user identifiers with unique device identifiers. If the unique device identifier is provided with the content request, the verification server 106 may proceed to determine a verified geolocation of the mobile device 102 based on the unique device identifier.

Depending on the content request, the verification server 106 may determine whether verification of the geolocation data is necessary. If the geolocation data provided with the request is near geolocation data provided in a previous content request, then the verification server 106 may determine that another verification of geolocation data is not required. For example, geolocation data provided with previous content requests may be used as a center point of a geo-fenced area, and boundaries or dimensions of the geo-fenced area may be a predetermined distance and/or a predetermined radius from the center point. Additionally, or alternatively, the geolocation data provided with the previous content request may be within a building or other physical structure, and the geo-fenced area may be a shape and/or a size of the building or other physical structure. As mentioned above, the size and shape of the geo-fenced area may be based on a predetermined radius around the center point. The geolocation data provided with the content request may be near the geolocation data provided in a previous content request when the geolocation data provided with the current content request is within the geo-fenced area.

If the verification server 106 determines that verification of the geolocation data is needed, the verification server 106 may directly or indirectly determine a verified geolocation of the mobile device 102. For example, the verification server 106 may request a mobile device network service provider server 110 transmit cell tower based geolocation data of the mobile device 102 and/or GPS based geolocation data of the mobile device 102 to the verification server 106. Alternatively, the verification server 106 may request that the mobile device 102 transmit GPS based geolocation data to the verification server 106.

When mobile device network service provider server 110 transmits the cell tower base geolocation data to the verification server 106, the verified geolocation data may be transmitted directly to verification server 106 and/or via the electronic communications network 108, such as, for example, the Internet. Additionally, or alternatively, mobile device 102 may transmit the GPS location information to the verification server 106 via the electronic communications network 108.

In one embodiment, the verification server 106 may transmit a verification request to mobile device network service provider server 110. The verification request may include the unique device identifier. The mobile device network service provider server 110 may use cell towers 104A-104C (or data therefrom) to determine verified geolocation data of the mobile device 102. For example, cell tower 104A may transmit a first ping to the mobile device 102. A first distance from cell tower 104A to mobile device 102 may be estimated based on a first lag time between a time when cell tower 104A transmits the ping to mobile device 102 and a time when cell tower 104A receives back an answer from the mobile device 102. Additionally, a second distance from cell tower 104B to mobile device 102 may be estimated based on a second lag time between a time when cell tower 104B transmits a ping to mobile device 102 and a time when cell tower 104 receives an answer back from mobile device 102. Further, a third distance from cell tower 104C to mobile device 102 may be estimated based on a third lag time between a time when cell tower 104C transmits a ping to mobile device 102 and a time when cell tower 104C receives an answer back from the mobile device 102.

Verification server 106 may then receive the distances from each of the cell towers 104A-104C from mobile device network service provider server 110, and may determine verified geolocation data of mobile device 102 based on the received distances. For example, verification server may determine the verified geographic location of mobile device 102 by looking up a geographic location of each cell tower 104A-104C. With each of the geographic locations of the cell towers 104A-104C and the distances from each of the cell towers 104A-104C, verification server 106 may triangulate the verified geographic location by calculating an intersecting point based on three distances and the geographic locations of the cell towers 104A-104C. Alternatively, or additionally, the verification server 106 may receive verified geolocation data of mobile device 102 from mobile device network service provider server 110, which may be based on the distances from each of the cell towers 104A-104C.

Alternatively, or additionally, verification server 106 may transmit a verification request to mobile device network service provider server 110. The verification request may include the unique device identifier. Mobile device network service provider server 110 may request that mobile device 102 determine its geographic location using global positioning satellites (GPS). If mobile device 102 has GPS capabilities, mobile device 102 may determine its geographic location based on triangulation by GPS signals, and may transmit the GPS-based geolocation data to mobile device network service provider server 110. Verification server 106 may then receive the GPS-based geolocation data of mobile device 102 from mobile device network service provider server 110. Alternatively, mobile device 102 may transmit the GPS-based geolocation data to verification server 106 via network 108.

After receiving one or both of the cell tower-based geolocation data and GPS-based geolocation data, verification server 106 may store one or both of the cell tower based geolocation data and GPS-based geolocation data in a verification server database 106A. One or both of the cell tower-based geolocation data and GPS-based geolocation data may be stored in association with one or both of the unique device identifier and/or the unique user identifier.

Along with the cell tower-based geolocation data and/or GPS-based geolocation data, a timestamp may be stored in association with the respective cell tower-based geolocation data and GPS-based geolocation data. The timestamp may be one or more of a time at which the verified geolocation data was determined by mobile device 102, a time at which the verified geolocation data was determined by mobile device network service provider server 110, a time at which the verified geolocation data was transmitted to verification server 106, a time at which the verified geolocation data was received at verification server 106, a time at which the verified geolocation data was stored in verification server database 106A.

The verification server 106 may then compare the verified geolocation data, such as one or both of the cell tower-based geolocation data and GPS=based geolocation data, to the geolocation data provided with the content request. For example, the verified geolocation data may be used as a center point of a geo-fenced area, and boundaries or dimensions of the geo-fenced area may be a predetermined distance and/or a predetermined radius from the center point. Alternatively, the verified geolocation data provided may be within a building or other physical structure, and the geo-fenced area may be a shape and/or a size of the building or other physical structure. Alternatively, or additionally, the size and shape of the geo-fenced area may be based on a predetermined radius around the center point and/or the building or other physical structure. The geolocation data provided with the content request may be verified when the geolocation data provided with the current content request is within the geo-fenced area. For example, when the geolocation data provided with the content request is within the geo-fenced area and/or within a predetermined radius of the verified geolocation data, the verification server may verify the geolocation data provide with the content request. The predetermined radius may be, for example, 1 meter, 5 meters, 10 meters, 100 meters, 250 meters, 500 meters, 1 kilometer, 3 kilometers, 5 kilometers, 10 kilometers, 25 kilometers, 50 kilometers, 100 kilometers, etc.

Additionally, or alternatively, the verification server 106 may score an accuracy of the geolocation data provided with the content request based on the verified geolocation data. For example, the closer the geolocation data provided with the content request is to the verified geolocation data, the higher the score for accuracy. By way of example, the verification server 106 may score the geolocation data provided with the content request with, e.g., a 100% when the geolocation data provided with the content request is less than or equal to 5 meters from the verified geolocation data, with, e.g., a 90% when the geolocation data provided with the content request is more than, e.g., 5 meters and less than or equal to, e.g., 10 meters from the verified geolocation data, etc. The scoring of the accuracy of the geolocation data provided with the content request may be implemented in additional and/or alternative scoring schemes.

Additionally, or alternatively, verification server 106 may score an accuracy of the geolocation data provided with the content request based on the verified geolocation data, a timestamp of the geolocation data provided with the content request, and/or a timestamp of the verified geolocation data. For example, the closer the location described by the geolocation data provided with the content request is to the location described by the verified geolocation data and the closer in time the timestamp of the geolocation data provided with the content request is to the timestamp of the verified geolocation data, the higher the score for accuracy. The verification server 106 may score the geolocation data provided with the content request with, e.g., a 100% when the geolocation data provided with the content request is less than or equal to, e.g., 25 meters from the verified geolocation data and when the timestamp of the geolocation data provided with the content request is within a predetermined amount of time of the timestamp of the verified geolocation data. The predetermined amount of time may be, e.g., less than 1 minutes, less than 2 minutes, less than 5 minutes, less than an hour, less than 6 hours, less than 12 hours, less than a day, less than a week, etc.

Upon completing verification of the geolocation data provided with the content request, the verification server may transmit a verification result to the server, application, application provider, and/or content provider that transmitted the content request with the geolocation data. The verification result may include a pass or a fail. Additionally, or alternatively, the verification result may include the determined score.

Figure 2:
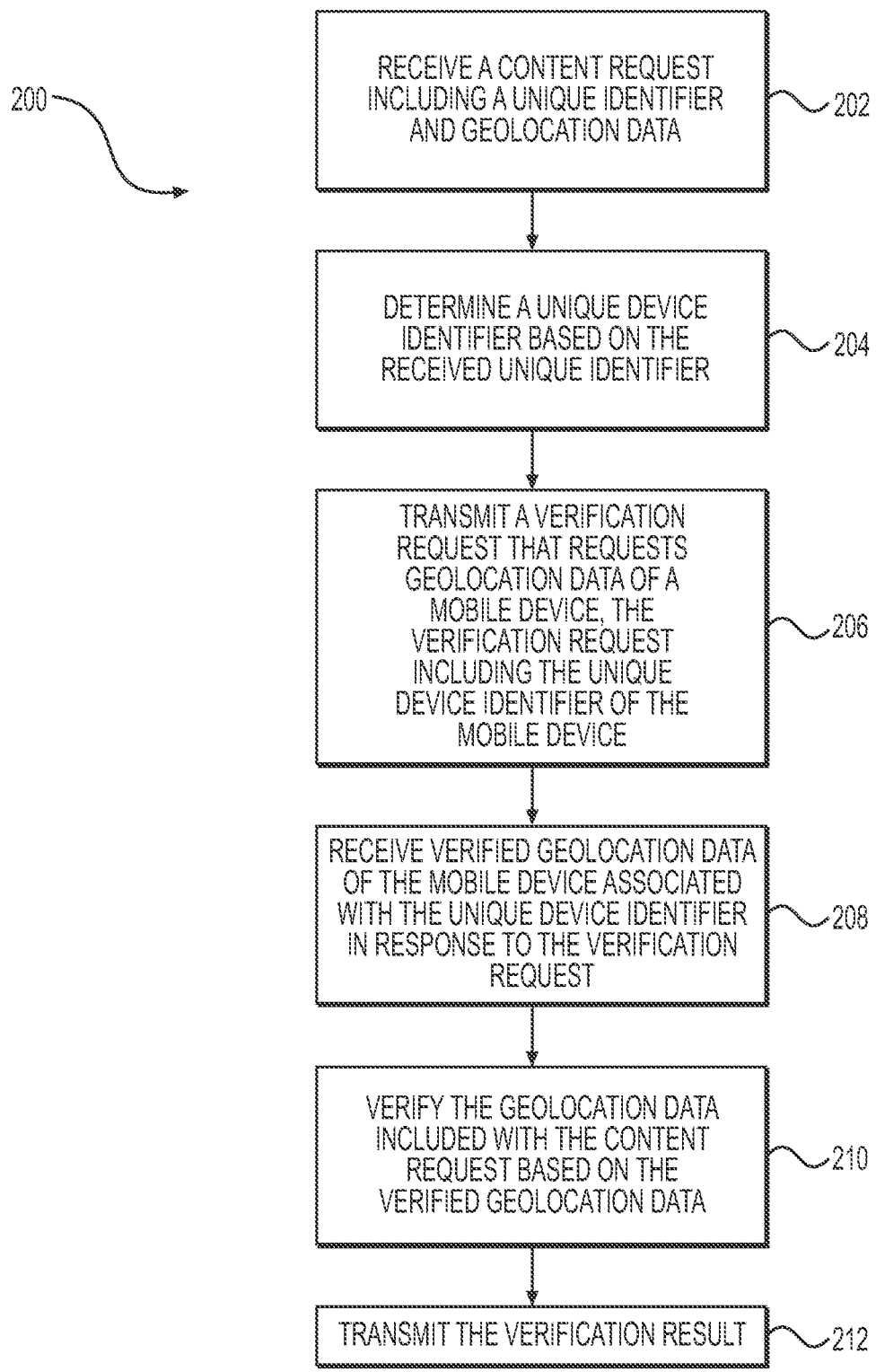
FIG. 2 depicts a method for verifying geolocation data provided with an electronic content request received from a mobile device, according to embodiments of the present disclosure.

FIG. 2 depicts a method for verifying geolocation data of a content request from a mobile device, according to embodiments of the present disclosure. Method 200 begins at step 202, in which one or more servers, such as verification server 106, may receive, over a network, a content request including a unique identifier and geolocation data. The one or more servers may receive the content request from an application running on a mobile device of a user, such as mobile device 102, an application provider that receives content requests from an application running on a mobile device of a user, and/or a content provider, such as content server 112, that may desire to respond to the content request.

The unique identifier may include a unique device identifier, which uniquely identifies a mobile device, such as mobile device 102. Alternatively, the unique identifier may include a unique user identifier, which uniquely identifies a user of the mobile device. The geolocation data may include one or more of GPS data, an address, a zip code, a postal code, a latitude, a longitude, an IP address, a country, a region, a city, a time zone, and/or other location data.

At step 204, the one or more servers may determine a unique device identifier based on the unique identifier or unique user identifier included with the content request. A unique device identifier may include a telephone number and/or an electronic serial number of a mobile device. If the unique identifier is a unique device identifier, the one or more servers may use the unique identifier as the unique device identifier. If the unique identifier is a unique user identifier, then the one or more servers may look up a unique device identifier associated with the unique user identifier that is stored in a database, such as verification server database 106A, that regularly stores unique user identifiers associated with unique device identifiers.

Then, at step 206, the one or more servers may transmit, over a network, a verification request that requests geolocation data of a mobile device, the verification request including the determined unique device identifier. In one embodiment, the one or more servers may transmit the verification request to a telecommunications carrier or a mobile device network service provider, such as mobile device network service provider server 110. In another embodiment, the one or more servers may transmit the verification request to the mobile device, such as mobile device 102.

At step 208, the one or more servers may receive, over the network, a response to the verification request, the response including verified geolocation data of a mobile device associated with the unique device identifier. When a mobile device network service provider transmits verified geolocation data, the mobile device network service provider may utilize cell towers to determine verified geolocation data of the mobile device. In one embodiment, the one or more servers may receive one or more distances the mobile device is from one or more cell towers, such as cell towers 104A-104C, and the one or more servers may determine verified geolocation data of the mobile device based on the received distances. For example, the one or more servers may determine the verified geographic location of mobile device by looking up a geographic location of each cell tower from which the one or more servers received a distance. With each of the geographic locations of the cell towers and the distances from each of the cell towers, the one or more servers may triangulate the verified geographic location by calculating an intersecting point based on three distances and the geographic locations of the cell towers. Alternatively, the one or more servers may receive verified geolocation data of the mobile device from the mobile device network service provider, which may be based on the distances from the one or more cell towers. Alternatively, the mobile device network service provider may request that the mobile device determine its geographic location using GPS, and the mobile device network service provider or the mobile device may transmit the verified geolocation data based on GPS to the one or more servers.

Then, at step 210, the one or more servers may verify the geolocation data included with the content request based on the received verified geolocation data. The one or more servers may verify the geolocation data by comparing the verified geolocation data to the geolocation data included with the content request. For example, the verified geolocation data may be used as a center point of a geo-fenced area, and boundaries or dimensions of the geo-fenced area may be a predetermined distance and/or a predetermined radius from the center point. Alternatively, the verified geolocation data provided may be within a building or other physical structure, and the geo-fenced area may be a shape and/or a size of the building or other physical structure. Alternatively, or additionally, the size and shape of the geo-fenced area may be based on a predetermined radius around the center point and/or the building or other physical structure. The geolocation data provided with the content request may be verified when the geolocation data provided with the current content request is within the geo-fenced area. For example, when the geolocation data provided with the content request is within the geo-fenced area and/or within a predetermined radius of the verified geolocation data, the verification server may verify the geolocation data provide with the content request. The predetermined radius may be, for example, 1 meter, 5 meters, 10 meters, 100 meters, 250 meters, 500 meters, 1 kilometer, 3 kilometers, 5 kilometers, 10 kilometers, 25 kilometers, 50 kilometers, 100 kilometers, etc.

Upon verifying the geolocation data included with the content request, at step 212, the one or more servers may transmit a verification result to the server, application, application provider, and/or content provider that transmitted the content request with the geolocation data. The verification result may include a pass or a fail.

Figure 3:
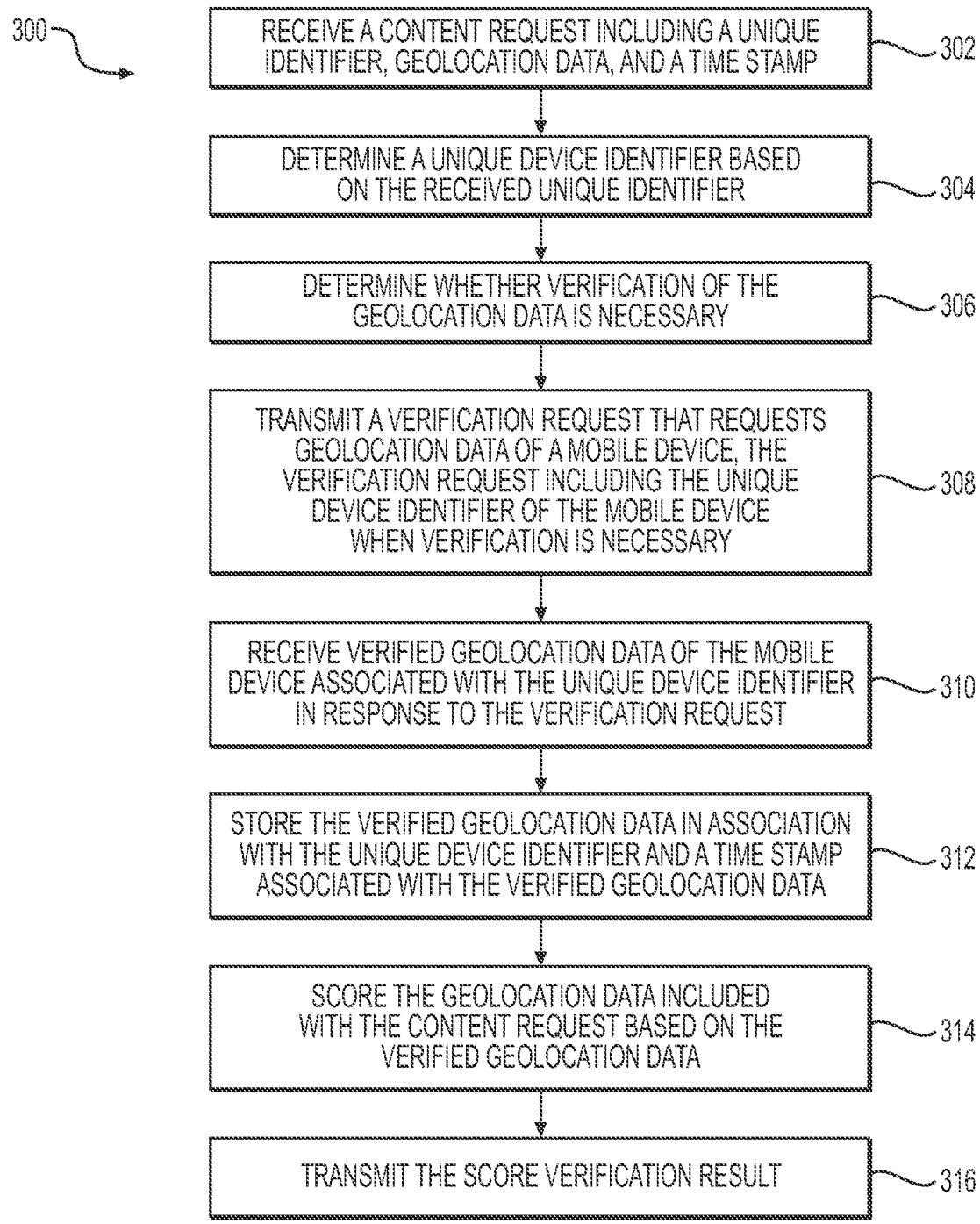
FIG. 3 depicts another method for verifying geolocation data of a content request from a mobile device, according to embodiments of the present disclosure.

FIG. 3 depicts another method for verifying geolocation data of a content request from a mobile device, according to embodiments of the present disclosure. Method 300 begins at step 302, in which one or more servers, such as verification server 106, may receive, over a network, a content request including a unique identifier, geolocation data, and a timestamp associated with the geolocation data included with the content request. The one or more servers may receive the content request from an application running on a mobile device of a user, such as mobile device 102, an application provider that receives content requests from an application running on a mobile device of a user, and/or a content provider, such as content server 112, that may desire to respond to the content request.

The unique identifier may include a unique device identifier, which uniquely identifies a mobile device, such as mobile device 102. Alternatively, the unique identifier may include a unique user identifier, which uniquely identifies a user of the mobile device. The geolocation data may include one or more of GPS data, an address, a zip code, a postal code, a latitude, a longitude, an IP address, a country, a region, a city, a time zone, and/or other location data. The timestamp associated with the geolocation data may be one or more of a time at which the geolocation data was determined by the application running on the mobile device, a time at which the geolocation data was transmitted to the one or more servers, and/or a time at which the geolocation data was received at the one or more servers.

At step 304, the one or more servers may determine a unique device identifier based on the unique identifier included with the content request. A unique device identifier may include a telephone number and/or an electronic serial number of a mobile device. If the unique identifier is a unique device identifier, the one or more servers may use the unique identifier as the unique device identifier. If the unique identifier is a unique user identifier, then the one or more servers may look up a unique device identifier associated with the unique user identifier that is stored in a database, such as verification server database 106A, that regularly stores unique user identifiers associated with unique device identifiers.

At step 306, the one or more servers may determine whether verification of the geolocation data is necessary. For example, the one or more servers may access the database, such as the verification server database 106A, that regularly stores the associated unique user identifiers with unique device identifiers. The database may further store the geolocation data included with content requests and the received timestamp associated with the geolocation data in association with one or more of the received unique identifier, the unique device identifier, and/or the unique user identifier. The database may also store the verified geolocation data and a timestamp associated with the verified geolocation data in association with one or more of the received unique identifier, the unique device identifier, and/or the unique user identifier.

The one or more servers may compare the geolocation data included with the content request to the stored verified geolocation data and the geolocation data included in a previous content request. Additionally, the one or more servers may compare the timestamp associated with the geolocation data to the stored timestamps. Based on the comparison, the one or more servers may determine whether verification of geolocation data is required. For example, if the timestamp of a stored verified geolocation data is within a predetermined amount of time of the received timestamp, and the stored verified geolocation data is within a predetermined radius of the received geolocation data, then the one or more servers may determine that verification of the geolocation is not needed or desired. For example, the stored verified geolocation data may be used as a center point of a geo-fenced area, and boundaries or dimensions of the geo-fenced area may be a predetermined distance and/or a predetermined radius from the center point. Additionally, or alternatively, the stored verified geolocation data may be within a building or other physical structure, and the geo-fenced area may be a shape and/or a size of the building or other physical structure. As mentioned above, the size and shape of the geo-fenced area may be based on a predetermined radius around the center point. Otherwise, the one or more servers may determine that verification of the geolocation data is necessary or desired.

When the one or more servers determines that verification of the geolocation data is necessary or desired, at step 308, the one or more servers may transmit, over a network, a verification request that requests geolocation data of a mobile device, the verification request including the determined unique device identifier associated with the mobile device. In one embodiment, the one or more servers may transmit the verification request to a mobile device network service provider, such as mobile device network service provider server 110. In another embodiment, the one or more servers may transmit the verification request to the mobile device, such as mobile device 102.

At step 310, the one or more servers may receive, over the network, a response to the verification request, the response including verified geolocation data of the mobile device associated with the unique device identifier. Then, at step 312, the one or more servers may store the received verified geolocation data and a verified timestamp in association with one or more of the unique identifier, the unique device identifier, and/or the unique user identifier. The verified timestamp may be one or more of a time at which the verified geolocation data was determined by the mobile device, a time at which the verified geolocation data was determined by the mobile device network service provider, a time at which the verified geolocation data was transmitted to the one or more servers, a time at which the verified geolocation data was received at the one or more servers, and/or a time at which the verified geolocation data was stored in the database.

Then, at step 314, the one or more servers may score the geolocation data included with the content request based on the verified geolocation data. Additionally, or alternatively, the one or more servers may score the geolocation data included with the content request-based timestamp associated with the geolocation data and based on the verified timestamp.

When a mobile device network service provider transmits verified geolocation data, the mobile device network service provider may utilize cell towers to determine verified geolocation data of the mobile device. In one embodiment, the one or more servers may receive one or more distances the mobile device is from one or more cell towers, such as cell tower 104A-104C, and the one or more servers may determine verified geolocation data of the mobile device based on the received distances. For example, the one or more servers may determine the verified geographic location of mobile device by looking up a geographic location of each cell tower from which the one or more servers received a distance. With each of the geographic locations of the cell towers and the distances from each of the cell towers, the one or more servers may triangulate the verified geographic location by calculating an intersecting point based on three distances and the geographic locations of the cell towers. Alternatively, the one or more servers may receive verified geolocation data of the mobile device from the mobile device network service provider, which may be based on the distances from the one or more cell towers. Alternatively, the mobile device network service provider may request that the mobile device determine its geographic location using GPS, and the mobile device network service provider or the mobile device may transmit the verified geolocation data based on GPS to the one or more servers.

After receiving the verified geolocation data, at step 314, the one or more servers may score the geolocation data included with the content request based on the verified geolocation data. The one or more servers may score the geolocation data by comparing the verified geolocation data to the geolocation data included with the content request. Depending on a distance of the geolocation data included with the content request from the verified geolocation data, the verification server may determine a scored verification result. For example, the closer the geolocation data included with the content request is to the verified geolocation data, the higher the scored verification result. The one or more servers may score the geolocation data with a number and/or a percentage. For example, the geolocation data may have a scored verification result of 100 and/or 100% when the geolocation data included with the content request is less than or equal to a predetermined distance, such as less than 5 meters from the verified geolocation data, with a 90 and/or 90% when the geolocation data included with the content request is more than the predetermined distance, such as 5 meters and less than or equal to a second predetermined distances, such as 10 meters from the verified geolocation data, etc. The scored verification result of the geolocation data included with the content request may be implement in additional and/or alternative scoring schemes.

Additionally, or alternatively, the one or more servers may determine the scored verification result of the geolocation data included with the content request based on the verified geolocation data, the timestamp associated with the geolocation data, and/or the timestamp of the verified geolocation data. For example, the closer the geolocation data included with the content request is to the verified geolocation data and the closer in time the timestamp of the geolocation data included with the content request is to the timestamp of the verified geolocation data, the higher the scored verification result. For example, the one or more servers may determine the scored verification result of the geolocation data to be 100 and/or 100% when the geolocation data is less than or equal to a first predetermined distances, such as 25 meters, from the verified geolocation data and when the timestamp of the geolocation data provided with the content request is within a predetermined amount of time of the timestamp of the verified geolocation data. The predetermined amount of time may be less than 1 minutes, less than 2 minutes, less than 5 minutes, less than an hour, less than 6 hours, less than 12 hours, less than a day, less than a week, etc. The one or more servers may also store the scored verification result in association with one or more of the, unique identifier, unique device identifier, and unique user identifier.

Upon scoring the geolocation data included with the content request, at step 316, the one or more servers may transmit the scored verification result to the server, application, application provider, and/or content provider that transmitted the content request with the geolocation data. The verification result may include a pass or a fail.

Figure 4:
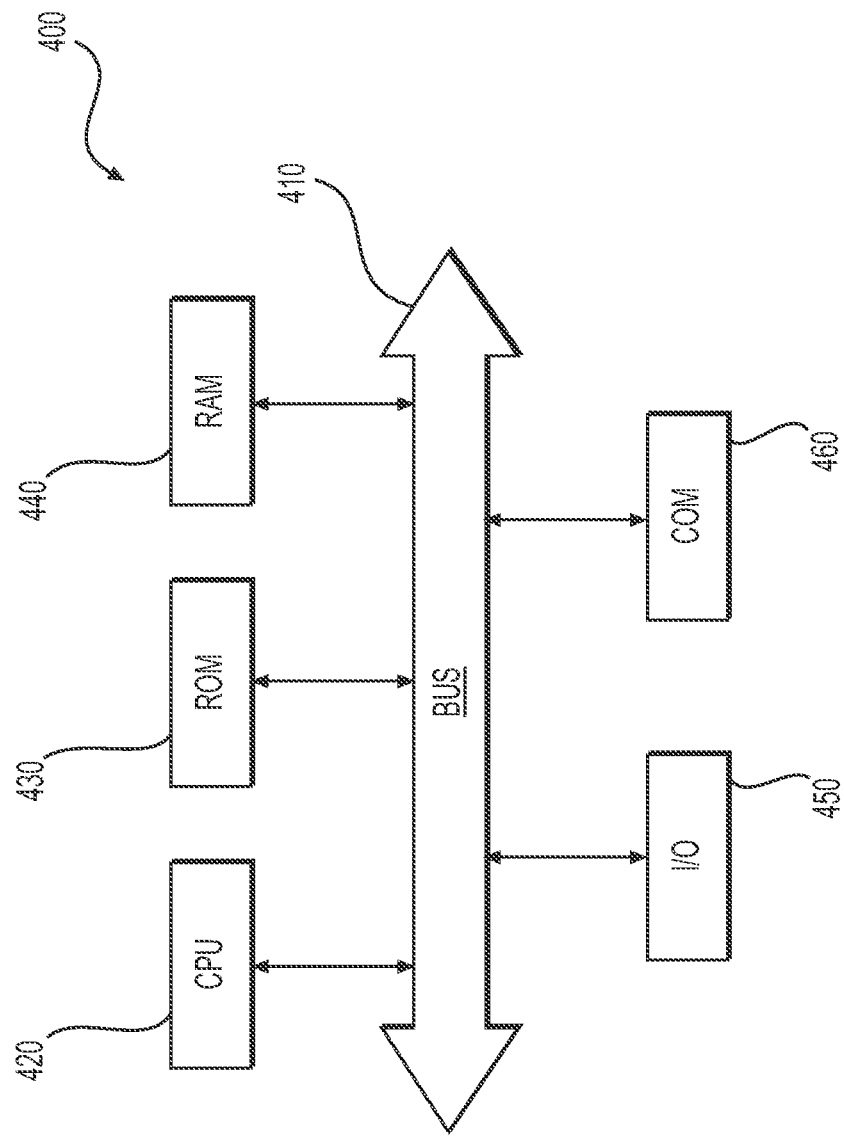
FIG. 4 is a simplified functional block diagram of a computer configured as a device for executing the methods of FIGS. 2 and 3, according to exemplary embodiments of the present disclosure.

FIG. 4 is a simplified functional block diagram of a computer that may be configured as the mobile devices, servers, providers, and/or network elements for executing the methods, according to exemplary an embodiment of the present disclosure. Specifically, in one embodiment, any of the user devices, servers, and/or exchanges may be an assembly of hardware 400 including, for example, a data communication interface 460 for packet data communication. The platform may also include a central processing unit ("CPU") 420, in the form of one or more processors, for executing program instructions. The platform typically includes an internal communication bus 410, program storage, and data storage for various data files to be processed and/or communicated by the platform such as ROM 430 and RAM 440, although the system 400 often receives programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

As will be recognized, the present disclosure is not limited to these particular embodiments. For instance, although described in the context of content requests, the present disclosure may also utilized for other types of requests.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computer-implemented method for verifying geolocation data provided with an electronic content request received from a mobile device, the method comprising:
  receiving, from the mobile device, a content request including a unique identifier and geolocation data associated with a current location of the mobile device;
  receiving, from a content server, a verification request that requests verified geolocation data of the mobile device, the verification request including the unique identifier associated with the mobile device;
  transmitting, to the mobile device, a request for verified location data based on triangulation of the mobile device within a communications network;
  receiving verified geolocation data of the mobile device in response to the request for verified location data;
  determining a geo-fenced area corresponding to the verified geolocation data received in relation to the request for verified location data; and
  transmitting the verified geolocation data to the content server based on the verified geolocation data being within the geo-fenced area.

2. The method of claim 1, wherein receiving verified geolocation data of the mobile device includes:
  receiving a first distance between the mobile device and a first data transmission tower;
  receiving a second distance between the mobile device and a second data transmission tower;
  receiving a third distance between the mobile device and a third data transmission tower and
  determining the verified geolocation data of the mobile device based on triangulating the first distance, the second distance, and the third distance.

3. The method of claim 1, wherein the unique identifier is a unique user identifier associated with a user of the mobile device, and further comprising:
  determining a unique device identifier based on the received unique identifier by:
    accessing a database that stores one or more unique user identifiers associated with a unique device identifier; and
    determining a unique device identifier based on the received unique user identifier provided.

4. The method of claim 1, further comprising:
  storing the verified geolocation data in association with the unique identifier;
  accessing the verified geolocation data in association with the unique identifier; and
  determining whether the verified geolocation data included with the content request is necessary based on the geolocation data included with the content request and the stored verified geolocation data.

5. The method of claim 1, further comprising:
  scoring the geolocation data included with the content request based on a degree of correspondence between the geolocation data included with the content request and the verified geolocation data; and
  transmitting a scored verification result.

6. The method of claim 1, wherein the content request further includes a timestamp associated with the geolocation data included with the content request, and
  wherein the method further comprises:
    receiving a verified timestamp associated with the verified geolocation data;

scoring the geolocation data included with the content request based on the geolocation data included with the content request, the verified geolocation data, the timestamp associated with the geolocation data included with the content request, and the verified timestamp associated with the verified geolocation data; and transmitting a scored verification result.

7. The method of claim 1, wherein receiving verified geolocation data of the mobile device further comprises:
receiving a global positioning system location of the mobile device.

8. A system for verifying geolocation data provided with an electronic content request received from a mobile device, the system including:
one or more data storage devices that store instructions for verifying geolocation data provided with an electronic content request received from a mobile device; and
one or more processors configured to execute the instructions to perform a method including:
receiving, from the mobile device, a content request including a unique identifier and geolocation data associated with a current location of the mobile device;
receiving, from a content server, a verification request that requests verified geolocation data of the mobile device, the verification request including the unique identifier associated with the mobile device;
transmitting, to the mobile device, a request for verified location data based on triangulation of the mobile device within a communications network;
receiving verified geolocation data of the mobile device in response to the provided verification request for verified location data;
determining a geo-fenced area corresponding to the verified geolocation data received in relation to the request for verified location data; and
transmitting the verified geolocation data to the content server based on the verified geolocation data being within the geo-fenced area.

9. The system of claim 8, wherein receiving verified geolocation data of the mobile device includes:
receiving, over the network at the one or more servers, a first distance between the mobile device and a first data transmission-tower;
receiving a second distance between the mobile device and a second data transmission tower;
receiving a third distance between the mobile device and a third data transmission tower and
determining, by the one or more servers, the verified geolocation data of the mobile device based on triangulating the first distance, the second distance, and the third distance.

10. The system of claim 8, wherein the unique identifier is a unique user identifier associated with a user of the mobile device, and further comprising:
determining a unique device identifier based on the received unique identifier by:
accessing, by the one or more servers, a database that stores one or more unique user identifiers associated with a unique device identifier; and
determining, by the one or more servers, a unique device identifier based on the received unique user identifier provided.

11. The system of claim 8, wherein the processor is further configured to execute the instructions to perform the method comprising:

storing, by the one or more servers in a database, the verified geolocation data in association with the unique identifier;
accessing, by the one or more servers, the database storing verified geolocation data in association with the unique identifier; and
determining, by the one or more servers, whether verification of the geolocation data included with the content request is necessary based on the geolocation data and the stored verified geolocation data.

12. The system of claim 8, wherein the processor is further configured to execute the instructions to perform the method comprising:
scoring, by the one or more servers, the geolocation data included with the content request based on a degree of correspondence between the geolocation data included with the content request and the verified geolocation data; and
transmitting, over the network by the one or more servers, a scored verification result.

13. The system of claim 8, wherein the content request further includes a timestamp associated with the geolocation data included with the content request, and
wherein the processor is further configured to execute the instructions to perform the method comprising:
receiving, by the one or more servers, a verified timestamp associated with the verified geolocation data;
scoring, by the one or more servers, the geolocation data included with the content request based on the geolocation data included with the content request, the verified geolocation data, the timestamp associated with the geolocation data included with the content request, and the verified timestamp associated with the verified geolocation data; and
transmitting, over the network by the one or more servers, a scored verification result.

14. The system of claim 8, wherein receiving verified geolocation data of the mobile device further comprises:
receiving, over the network at the one or more servers, a global positioning system location of the mobile device.

15. A non-transitory computer-readable medium storing instructions that, when executed by one or more servers, cause the one or more servers to perform a method for verifying geolocation data received from a mobile device, the method including:
receiving, from the mobile device, a content request including a unique identifier and geolocation data associated with a current location of the mobile device;
receiving, from a content server, a verification request that requests verified geolocation data of the mobile device, the verification request including the unique identifier associated with the mobile device;
transmitting, to the mobile device, a request for verified location data based on triangulation of the mobile device within a communications network;
receiving verified geolocation data of the mobile device in response to the request for verified location data;
determining a geo-fenced area corresponding to the verified geolocation data received in relation to the request for verified location data; and
transmitting the verified geolocation data to the content server based on the verified geolocation data being within the geo-fenced area.

16. The computer-readable medium of claim 15, wherein receiving verified geolocation data of the second mobile device includes:

receiving, over the network at the one or more servers, a first distance between the mobile device and a first data transmission-tower;

receiving a second distance between the mobile device and a second data transmission tower;

receiving a third distance between the mobile device and a third data transmission tower and determining, by the one or more servers, the verified geolocation data of the mobile device based on triangulating the first distance, the second distance, and the third distance.

17. The computer-readable medium of claim 15, wherein the unique identifier is a unique user identifier associated with a user of the mobile device, and further comprising:

determining a unique device identifier based on the received unique identifier by:

accessing, by the one or more servers, a database that stores one or more unique user identifiers associated with a unique device identifier; and determining, by the one or more servers, a unique device identifier based on the received unique user identifier provided.

18. The computer-readable medium of claim 15, the one or more servers being further configured to execute the instructions to perform the method comprising:

storing, by the one or more servers in a database, the verified geolocation data in association with the unique identifier;

accessing, by the one or more servers, the database storing verified geolocation data in association with the unique identifier; and determining, by the one or more servers, whether verification of the geolocation data included with the content request is necessary based on the geolocation data included with the content request based and stored verified geolocation data.

19. The computer-readable medium of claim 15, wherein the one or more servers are further configured to execute the instructions to perform the method comprising:

scoring, by the one or more servers, the geolocation data included with the content request based on a degree of correspondence between the geolocation data and the verified geolocation data.

20. The computer-readable medium of claim 15, wherein the content request further includes a timestamp associated with the geolocation data, and wherein the one or more servers are further configured to execute the instructions to perform the method comprising:

receiving, by the one or more servers, a verified timestamp associated with the verified geolocation data; and scoring, by the one or more servers, the geolocation data included with the content request based on the geolocation data included with the content request, the verified geolocation data, the timestamp associated with the geolocation data, and the verified timestamp associated with the verified geolocation data.

* * * * *